July 16, 1935. E. A. STALKER 2,008,424
AIRCRAFT
Filed Jan. 5, 1931 3 Sheets-Sheet 1
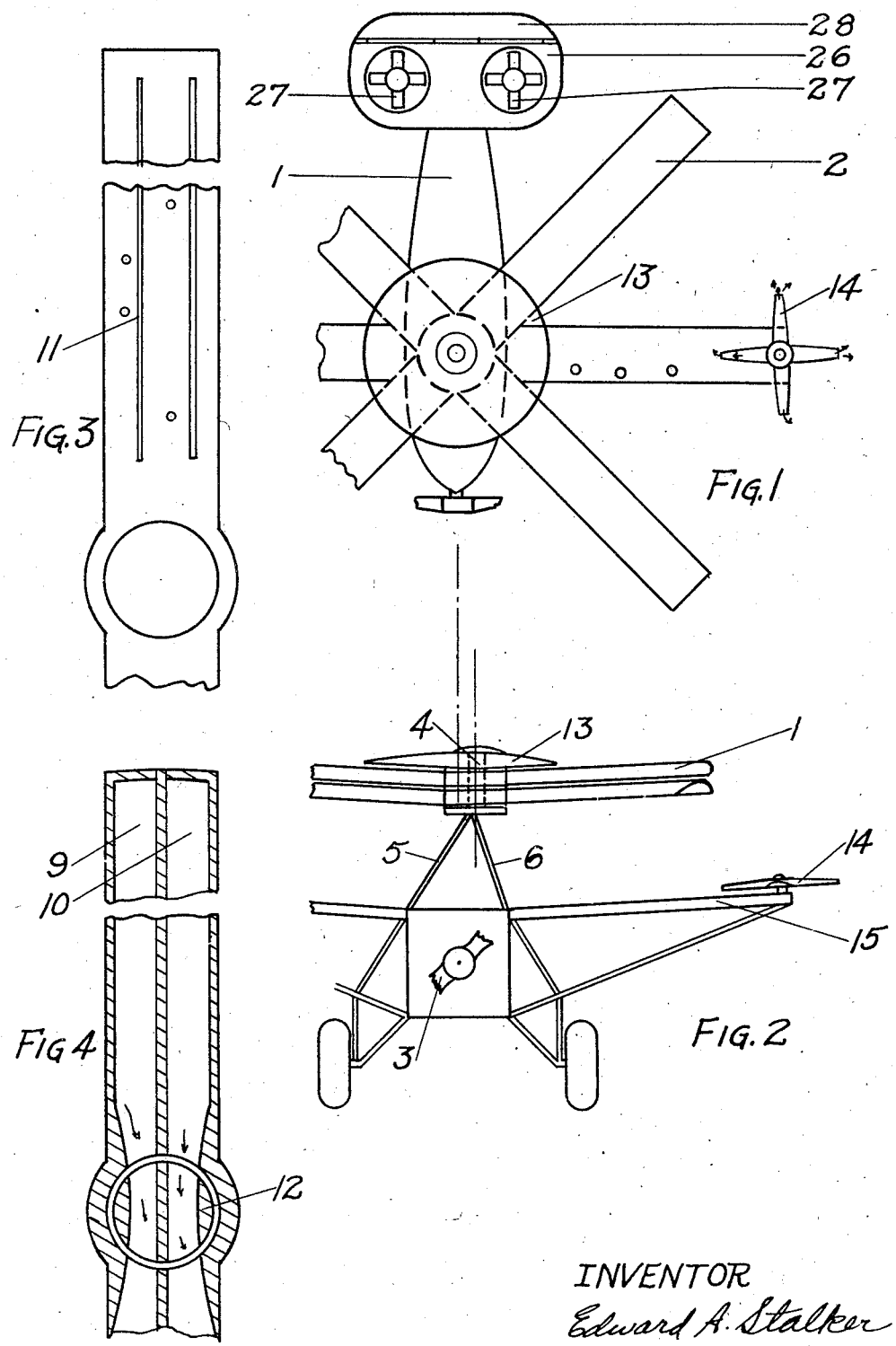
INVENTOR
Edward A. Stalker July 16, 1935.  E. A. STALKER  2,008,424
AIRCRAFT
Filed Jan. 5, 1931   3 Sheets-Sheet 2

Edward A. Stalker
INVENTOR

July 16, 1935.  E. A. STALKER  2,008,424
AIRCRAFT
Filed Jan. 5, 1931  3 Sheets-Sheet 3

INVENTOR
Edward A. Stalker

Patented July 16, 1935

2,008,424

UNITED STATES PATENT OFFICE 2,008,424

AIRCRAFT

Edward A. Stalker, Ann Arbor, Mich.

Application January 5, 1931, Serial No. 506,619

5 Claims. (Cl. 244—15)

My invention relates to improvements in flying machines consisting of a single central airscrew rotating about a substantially vertical axis and a means to control the flying machine. In particular I show how, when the aircraft is advancing, the moments transverse to the airscrew disk may be brought to equilibrium by boundary layer control.

I attain these objects by the devices illustrated in the accompanying drawings in which—

Figure 5:
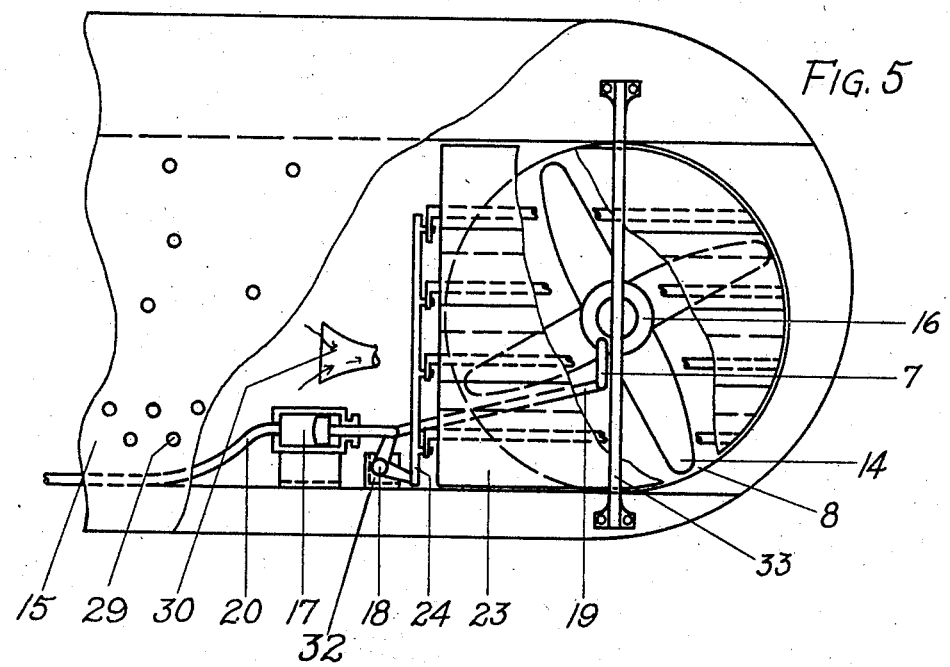
Figure 6:
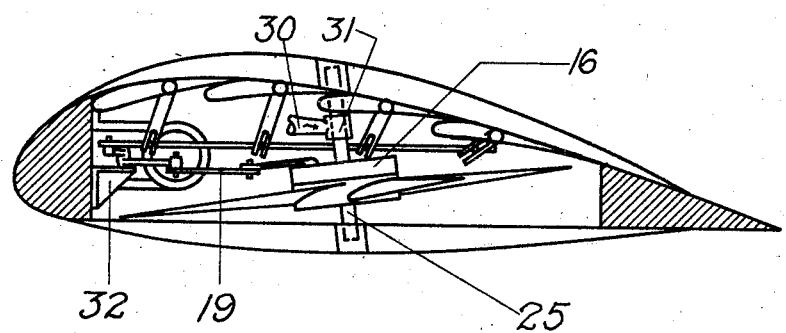
Figure 7:
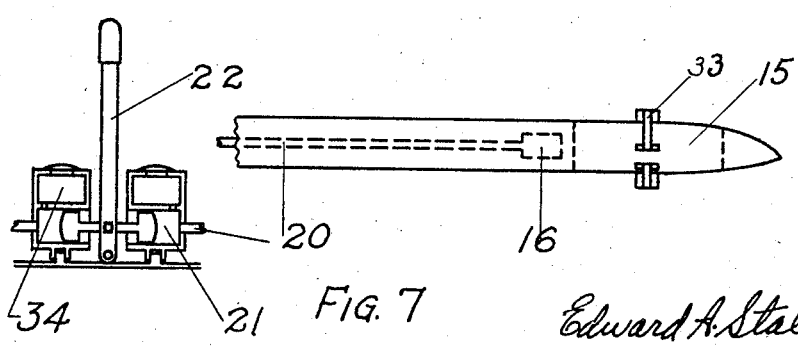
Figure 8:
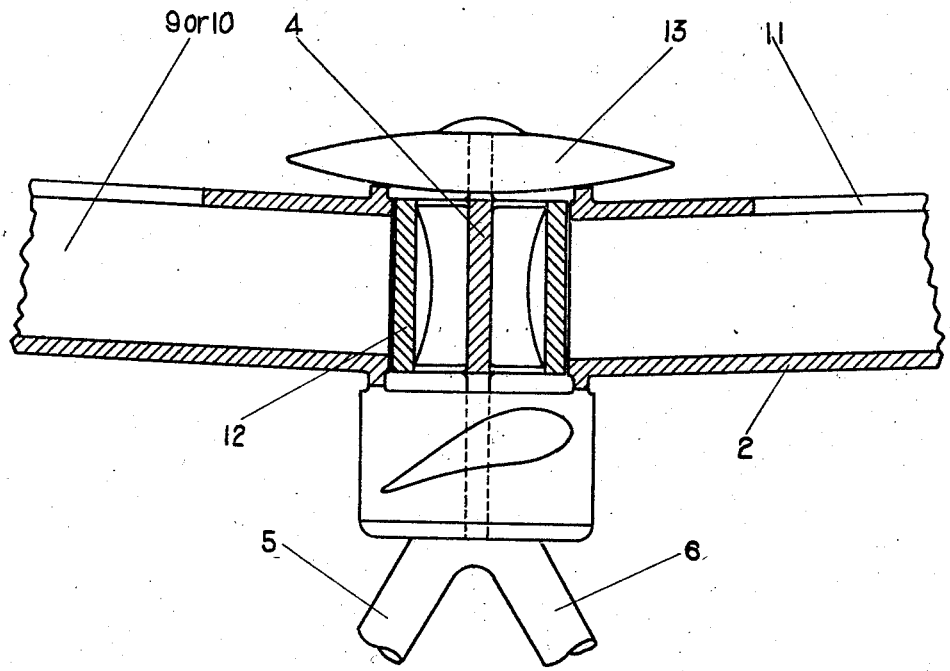
Figure 9:
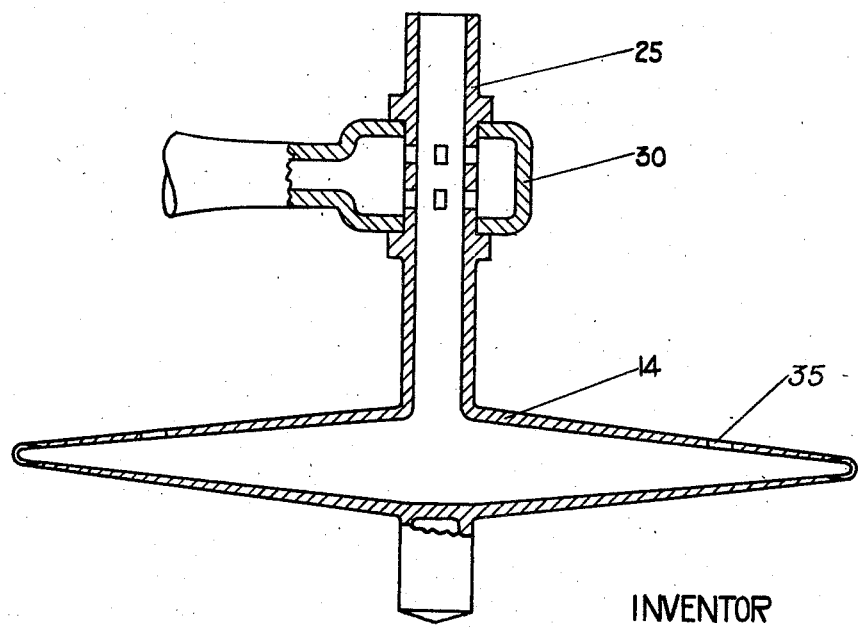

Figure 1 is a plan view of the flying machine and Figure 2 is a front elevation. A plan of one of the blades is shown in Figure 3. A horizontal cross section of the blade is shown in Figure 4. Figures 5 and 6 show the lateral control device in the wing tip while Figure 7 shows an elevation partly in section of the mechanism to operate the aileron. Figure 8 is an elevation of the lifting airscrew with the upper blades shown in a section at right angles to the blade and somewhat off from the axis of rotation. Figure 9 shows a vertical section of the aileron airscrew at the wing tip.

Similar numerals refer to similar parts throughout the several views.

The fuselage of the machine is indicated by 1 and the airscrew by 2. The machine may be propelled by the propeller 3. As a result of the translational velocity of the aircraft there is an upflow through the airscrew due to the angle at which the airscrew is set to the relative wind. In Figure 2 the airscrew is shown supported by the shaft 4 which is free to rotate on the journal supported by members 5 and 6.

If an aircraft were supported by a lifting airscrew located over the center of the lateral mass distribution the transverse moments on the airscrew would be equal only when the craft was descending. For, if means of forward locomotion were used and the airscrew moved approximately parallel to its plane, an upsetting moment would result from the higher speed of the advancing blade compared to the retreating blade. For this reason airscrews with rigid blades have never been used as a supporting device except where two or more are located symmetrically with respect to the center of gravity, and in pairs have opposite directions of rotation. In my invention means are introduced to provide for an increase of lift of the retreating blade by energizing its boundary layer. Figures 3 and 4 show how this is done.

The blades are hollow and each set of two blades is superposed on the next two. The blades contain passages 9 and 10 which communicate with holes 11 in the wing on both sides of the axis of rotation. Thus when high velocities are experienced by only one blade which generates high pressures, it is possible for the pressures to equalize between the two blades by means of the interconnecting passage. The wing is further subdivided into passages so that the part of the blade near the trailing edge equalizes its pressure with the part near the trailing edge of the opposite blade. This may even be carried further so that the portions of the blades near the hub equalize their pressures, and the outer portions their pressures.

The equalization of the lift on the retreating and advancing blades is accomplished through the boundary layer phenomena. If, on a wing, the layer of air which is slowed down due to friction with the wing surface is removed the lift of the wing may increase. This layer of air is called the boundary layer. More scientifically it may be said: If the boundary layer has energy added to it to increase its rate of flow the lift of the wing will increase. Conversely if air of less energy is drawn into the boundary layer the lift will decrease. Drawing the boundary layer into the wing adds energy to it.

In my invention the advancing blade has a greater suction over its upper surface than the retreating blade. Since the openings of the two blades are in communication with each other, the boundary layer on the retreating wing will be drawn into the blade and air will flow out the openings of the advancing blade. Thus the lift of the retreating blade will be increased due to the boundary layer energization and the lift of the advancing blade will be decreased due to the dead air added to its boundary layer. Thus the upsetting or transverse moments on the lifting airscrew will approach very closely to equalization.

Even where two airscrews are located on the same axis and each rotates in a different direction, this invention is very useful. Of course, the moments on the aircraft as a whole are in balance in this case but the individual airscrews have still the unbalanced moments acting upon them. These moments cause a violent vertical vibration of the blades which would soon cause the blade to break near the hub due to a fatigue failure. If the boundary layer is removed so that the moments become equal for all the blades of the airscrew this fatigue action will disappear with a great increase in the economy and safety of flight.

Hence it is an important feature of my invention that translation, either forward or sidewise, may be combined, without unbalance, in an aircraft supported directly by a rotating airscrew in which the boundary layer is altered.

I show a propeller as a means of propulsion, but it is also clear that in a forward glide there is translation at the expense of gravity and it is equally important in such a glide that lateral balance be maintained. A means of longitudinal control such as the horizontal tail plane is essential for this type of translation.

It is an essential feature of boundary layer energization that the openings be on the upper surface of the blades or wings.

The passages 9 and 10 are of easy form and pass through a valve 12 at the center. This valve serves to stop any surging in the wings for it will be closed when the blades lie more or less along the direction of the relative wind.

The main airscrew 2 is set off center from the centerline of the rest of the machine by a small percentage of the span to counteract a part of the dissymmetry of lift, since in some designs it may not be desirable to provide for a complete equalization of the lifts on the blades by means of the interchange of fluid pressures. In fact since a spanwise flow must always take place to equalize the pressures there will always be some small residue of unbalanced lift on the two sides. That is, the flow will not take place instantaneously from one blade to the other. The offset serves the purpose of equalizing the moment due to this small residue.

The inner third of the diameter of the screws is not very effective in producing lift. Hence it is desirable to incorporate a lift producing element at the center of the airscrew. It is also desirable to provide a lifting surface which will not decrease in lifting efficiency with large angles of attack. It is known that a square or round wing does not reach a maximum lift until in the neighborhood of 45°. Thus a circular wing 13 at the center of the airscrew will improve its efficiency for it will provide for a more uniform lift distribution across the span or diameter of the airscrew, and hence will in effect increase the aspect ratio of the disc swept by the screw. The upflow about the disc will reduce the induced drag of the blades.

The blades all make an angle less than 90° with the upwardly directed axis of rotation. This insures a good degree of stability.

Lateral control is obtained from two other airscrews 14 eccentrically disposed with regard to the center of mass of the craft. They may be carried on the wing 15 which is suitably braced. The two airscrews ordinarily run at their maximum rate of rotation and contribute to the lift of the aircraft. When stopped or slowed down the airscrews' lifts diminish greatly. Hence to provide lateral control it is only necessary to brake one of the airscrews. The braking device will be described presently.

The wing 15 has openings 29 in its surfaces, and the airscrew 14 is hollow and open at the tips. The shaft 25 is also hollow and is in communication with the interior of the blades. The high rate of rotation discharges the air through the blade tips and effectively removes the boundary layer from the wings in a manner described in my Patent Number 1,691,942, dated Nov. 20, 1928. The removal of the boundary layer provides for the continuation of the increase in lifting capacity of the wing with increasing angles of attack. Large angles will be encountered upon landing. Without suction the wing lift would burble at comparatively small angles.

The combination of the suction function together with the airscrew for lateral control gives a more powerful aileron control, for when the airscrew 14 is braked thus reducing its rate of rotation, not only is its lift reduced but the lift of the wing is reduced also because the suction is lessened so that a powerful rolling moment is induced, which is particularly desirable at large angles of incidence where control is usually lacking in present day aircraft.

The varying of the rate of rotation of the airscrews 14 may be accomplished in a number of ways and the airscrew may be located at various points. In Figure 5, for instance, the airscrew is set into the wing. In this case the connection of the interior of the shaft with the interior of the wing is shown by the tube 30. It communicates with the interior of the shaft through the bearing 31. It is clear, however, that the brake to be described may be applied to the airscrew above the wing without substantial modification, since it is not essential that the brake lie in a plane in close proximity to the plane of the airscrew. It is also clear that the windmill could, if desired, be used to drive a separate blower. The location within the wing provides for less resistance to forward motion and for a high rate of rotation of the airscrew at all angles of attack. Hence the lift and the available rolling moment of the airscrews are increased.

In Figure 5 the brake is indicated by the numeral 16. It may be of internal construction similar to automobile brakes, and it may be actuated by a variety of means. A hydraulic means is shown which consists of the cylinder and piston 17 operating the bell crank 18 which in turn operates the rod 19 leading to the brake. The cylinder and piston 17 are operated by the oil pressure through the tube 20 which is in communication with the piston and cylinder 21 actuated by the control stick 22.

Vanes 23 are also provided to close up the opening and reduce the amount of air flowing through the screw as well as reducing the resistance of the wing and screw combination. The vanes are operated by the hydraulic mechanism acting through the bell crank 18 and connecting rod 24. The vanes and brakes also provide double insurance for steering control.

The control airscrews are set to provide a dihedral angle above them less than 180° to insure a good degree of lateral stability. The upwardly directed axis of rotation is also inclined forward to provide a forward component of force from the lift of the airscrew. This is shown in Figure 6 by the axis of rotation 25.

The tail plane 26 carries two airscrews 27 similar to those described for the lateral control. The tail plane has the conventional elevator 28 which governs the rate of rotation of the airscrews for when the trailing edge of the elevator is depressed, the resultant increase of pressure below the tail plane sends a stronger stream of air through the screws which results in a greater lifting action from the screws. In a similar way raising the trailing edge of the elevator reduces the lift of the screws. Effective longitudinal control is thus assured at large angles of attack of the tail plane without great forward velocity. Additional effect can be secured if desired by braking the airscrews when the elevator is raised, as was pointed out for the lateral screws.

Another advantage of the rigid blade for the main lifting screw is shown in Figure 2. For a given landing speed a large airscrew is necessary, in other words a large disk area. The area of the blades bears a more or less fixed ratio to the disc area, so that if a large span is used, the profile drag of the blades is high because of the large area. Yet a large span or diameter is desirable because the induced drag is proportional to the square of the weight per span. It is desirable then to extend the span without increasing the disc area. This may be accomplished by locating lifting screws side by side and extending spanwise. For best efficiency the discs must overlap, and not too great a vertical gap should be used. Since the blades are rigid their discs may be brought into close proximity without fear of the blades colliding. The lateral airscrews 14 may be brought up very close to the main screws.

I am aware that prior to my invention airscrews driven by a prime mover have been used to obtain steering control. It should therefore be noted that my airscrews operate as windmills, or auto rotate.

I claim:

1. In an aircraft, a body, a wing system comprising a plurality of oppositely arranged blades mounted to rotate in the same direction in a substantially horizontal plane, a supporting structure securing the system to the body, an opening in the leading portion of the upper surface of one blade, an opening in the trailing portion of the upper surface of an opposite blade, and means to energize the boundary layer of the blade to oppose the upsetting moments due to the dissymmetry in relative velocities between the advancing and retreating blades comprising means for placing said openings in communication when the blades attain a predetermined laterally extending position.

2. In combination in an aircraft supported by a central lifting airscrew having oppositely extending blades, forward passages in the forward portion of each of said blades, a rearward passage in the rearward portion of each of said blades, openings in the blade surfaces communicating with the said passages, and means to put the forward passage of each blade into communication with the rearward passage of an opposite blade when the blades attain a predetermined position in their rotative movements.

3. In combination in an aircraft supported by a lifting airscrew having opposed blades of substantially constant volume, passages in the blades, forward and rearward openings in the surfaces of the blades, and a fixed valve for placing a forward opening of one blade in communication with a rearward opening of an opposed blade to permit a flow of fluid inward through the opening of one blade and outward through the communicating opening in the other blade.

4. In an aircraft, a rotatable wing system comprising a plurality of opposed blades adapted to rotate about a substantially vertical axis, means for securing said wing system to the aircraft, the blades having compartments and having openings in the blade upper surface in communication with said compartments, and passages for placing the compartment of one blade directly in closed communication with the compartment of an opposite blade, when the blades attain a predetermined position with respect to the aircraft.

5. In an aircraft, an airscrew rotating in a substantially horizontal plane and having a plurality of lifting blades having openings in their upper surfaces and having compartments therein in communication with said openings, and means to confine the intercommunication of the passage of one blade with the passage of an opposite blade when the blades are at a predetermined lateral angle with respect to forward flight.

EDWARD A. STALKER.